(12) United States Patent
Sennoun (10) Patent No.: US 11,125,160 B2
(45) Date of Patent: Sep. 21, 2021

(54) METHOD AND SYSTEM FOR COMBINATION HEAT EXCHANGER

(71) Applicant: General Electric Company, Schenectady, NY (US)

(72) Inventor: Mohammed El Hacin Sennoun, West Chester, OH (US)

(73) Assignee: General Electric Company, Schenectady, NY (US)

( * ) Notice: Subject to any disclaimer, the term of this patent is extended or adjusted under 35 U.S.C. 154(b) by 534 days.

(21) Appl. No.: 14/981,113

(22) Filed: Dec. 28, 2015

(65) Prior Publication Data
US 2017/0184024 A1 Jun. 29, 2017

(51) Int. Cl.
| | |
|---|---|
| *F02C 7/12* | (2006.01) |
| *F02C 7/14* | (2006.01) |
| *F02K 3/115* | (2006.01) |
| *F01D 9/06* | (2006.01) |

(Continued)

(52) U.S. Cl.
CPC ............... *F02C 7/12* (2013.01); *F01D 9/041* (2013.01); *F01D 9/065* (2013.01); *F01D 25/12* (2013.01);
(Continued)

(58) Field of Classification Search
CPC .... F02C 7/14; F02C 7/18; F02C 7/185; F02C 7/12; F05D 2260/213; F05D 2260/205;
(Continued)

(56) References Cited

U.S. PATENT DOCUMENTS

| | | | |
|---|---|---|---|
| 2,474,258 A | 6/1949 | Kroon | |
| 4,136,516 A | 1/1979 | Corsmeier | |

(Continued)

FOREIGN PATENT DOCUMENTS

| | | | |
|---|---|---|---|
| EP | 0 926 323 A2 | 6/1999 | |
| EP | 2 339 144 A2 | 6/2011 | |

(Continued)

OTHER PUBLICATIONS

Extended European Search Report and Opinion issued in connection with corresponding EP Application No. 16203099.3 dated May 29, 2017.

(Continued)

*Primary Examiner* — Alain Chau
(74) *Attorney, Agent, or Firm* — Dority & Manning, P.A.

(57) ABSTRACT

The heat exchanger system includes a first heat exchanger assembly including a plurality of airfoil members circumferentially spaced in a flow stream of an annular duct. Each airfoil member including a radially inner end and a radially outer end and a first internal flowpath configured to channel a flow of cooled fluid therethrough. The heat exchanger assembly includes a second heat exchanger assembly including a plurality of fin members extending proximate the flow stream and a second internal flowpath configured to channel a flow of cooled fluid therethrough. The heat exchanger assembly includes a header system including a conduit path configured to couple the first heat exchanger assembly and the second heat exchanger assembly in flow communication. The header system includes an inlet connection configured to receive a flow of hot fluid from thermal loads and an outlet connection configured to direct cooled fluid to thermal loads.

17 Claims, 10 Drawing Sheets

(51) Int. Cl.
| | |
|---|---|
| *F01D 25/12* | (2006.01) |
| *F01D 25/18* | (2006.01) |
| *F01D 9/04* | (2006.01) |
| *F02C 3/04* | (2006.01) |
| *F02K 3/06* | (2006.01) |

(52) U.S. Cl.
CPC .............. *F01D 25/18* (2013.01); *F02C 3/04* (2013.01); *F02C 7/14* (2013.01); *F02K 3/06* (2013.01); *F02K 3/115* (2013.01); *F05D 2220/323* (2013.01); *F05D 2240/35* (2013.01); *F05D 2260/213* (2013.01)

(58) Field of Classification Search
CPC ........... F05D 2260/22141; F01D 25/12; F01D 25/125; F01D 9/065; F01D 9/04; F01D 9/041; Y02T 50/675; F02K 3/115; F02K 3/04–3/065; B64D 33/08; B64D 33/10; B64D 2033/024; F28D 2021/0049; F28D 2021/0089; F28D 2021/0021
See application file for complete search history.

(56) References Cited

U.S. PATENT DOCUMENTS

| | | | | |
|---|---|---|---|---|
| 4,151,710 | A * | 5/1979 | Griffin | F02C 7/14 184/6.11 |
| 4,187,675 | A * | 2/1980 | Wakeman | F02C 7/185 165/163 |
| 4,542,623 | A * | 9/1985 | Hovan | F01D 25/125 165/51 |
| 4,773,212 | A * | 9/1988 | Griffin | F02C 7/224 60/226.1 |
| 4,782,658 | A * | 11/1988 | Perry | F02C 7/047 60/226.1 |
| 4,914,904 | A | 4/1990 | Parnes et al. | |
| 5,205,115 | A | 4/1993 | Plemmons et al. | |
| 5,297,386 | A * | 3/1994 | Kervistin | F01D 11/24 60/226.1 |
| 6,134,880 | A * | 10/2000 | Yoshinaka | F28D 7/00 60/226.1 |
| 6,334,297 | B1 | 1/2002 | Dailey et al. | |
| 6,430,931 | B1 * | 8/2002 | Horner | F04D 29/5826 60/785 |
| 7,377,098 | B2 | 5/2008 | Walker et al. | |
| 7,377,100 | B2 * | 5/2008 | Bruno | F02C 7/14 60/267 |
| 7,900,437 | B2 | 3/2011 | Venkataramani et al. | |
| 7,900,438 | B2 | 3/2011 | Venkataramani et al. | |
| 7,908,840 | B2 | 3/2011 | Schwarz et al. | |
| 8,235,657 | B2 * | 8/2012 | Bulin | F01D 9/065 415/176 |
| 8,333,552 | B2 * | 12/2012 | Wood | F01D 5/147 415/119 |
| 8,387,362 | B2 * | 3/2013 | Storage | F28F 1/04 60/266 |
| 8,499,822 | B2 * | 8/2013 | Bulin | F02C 7/14 165/41 |
| 8,544,531 | B2 | 10/2013 | Scott et al. | |
| 8,596,970 | B2 * | 12/2013 | Speed | F01D 9/041 415/209.4 |
| 8,601,791 | B2 * | 12/2013 | Bajusz | F28D 9/0018 60/267 |
| 8,616,834 | B2 | 12/2013 | Knight, III et al. | |
| 8,721,271 | B2 * | 5/2014 | Wang | F02C 7/14 415/177 |
| 8,776,952 | B2 * | 7/2014 | Schwarz | F01D 25/18 184/104.1 |
| 8,967,958 | B2 * | 3/2015 | Bajusz | F02C 7/14 415/178 |
| 9,114,877 | B2 * | 8/2015 | Weber | B64D 13/00 |
| 9,422,063 | B2 * | 8/2016 | Diaz | F02K 3/115 |
| 9,599,410 | B2 * | 3/2017 | Antel, Jr. | F02C 3/04 |
| 9,677,474 | B2 * | 6/2017 | Hundley, Jr. | F02C 7/32 |
| 9,945,325 | B2 * | 4/2018 | Roberge | F02K 3/105 |
| 10,145,253 | B2 * | 12/2018 | Bordoni | F01D 9/04 |
| 10,196,932 | B2 * | 2/2019 | Sennoun | F01D 9/065 |
| 2006/0042223 | A1 * | 3/2006 | Walker | F01D 25/162 60/39.08 |
| 2009/0165995 | A1 * | 7/2009 | Bajusz | F28F 1/34 165/51 |
| 2009/0313999 | A1 * | 12/2009 | Hunter | F01D 25/18 60/772 |
| 2010/0028139 | A1 * | 2/2010 | Bulin | F01D 9/065 415/178 |
| 2010/0155016 | A1 * | 6/2010 | Wood | F02C 7/12 165/51 |
| 2010/0212857 | A1 * | 8/2010 | Bulin | F02C 7/14 165/41 |
| 2010/0236215 | A1 * | 9/2010 | Venkataramani | F28D 7/0008 60/39.093 |
| 2011/0014028 | A1 * | 1/2011 | Wood | F01D 25/12 415/1 |
| 2011/0079021 | A1 * | 4/2011 | Maldonado | F01D 9/041 60/806 |
| 2011/0146229 | A1 * | 6/2011 | Bajusz | F01D 25/14 60/226.1 |
| 2011/0268562 | A1 | 11/2011 | Knight, III et al. | |
| 2012/0048509 | A1 * | 3/2012 | Weber | B64D 15/04 165/63 |
| 2012/0128467 | A1 * | 5/2012 | Ruthemeyer | F01D 5/146 415/115 |
| 2012/0243970 | A1 * | 9/2012 | Hellgren | F01D 5/187 415/1 |
| 2013/0011246 | A1 | 1/2013 | Todorovic | |
| 2013/0219854 | A1 | 8/2013 | Alecu | |
| 2013/0239542 | A1 * | 9/2013 | Dasgupta | F02C 7/143 60/39.093 |
| 2014/0027102 | A1 * | 1/2014 | Antel, Jr. | F28F 13/003 165/185 |
| 2014/0096534 | A1 * | 4/2014 | Snape | F02C 7/14 60/782 |
| 2014/0202158 | A1 * | 7/2014 | Storage | F02C 7/14 60/722 |
| 2014/0209286 | A1 | 7/2014 | Freund et al. | |
| 2014/0223917 | A1 * | 8/2014 | Gameiro | F01D 25/18 60/772 |
| 2014/0352315 | A1 | 12/2014 | Diaz | |
| 2015/0000865 | A1 * | 1/2015 | Ueda | F02C 7/14 165/51 |
| 2015/0135726 | A1 | 5/2015 | Hundley, Jr. et al. | |
| 2015/0198092 | A1 * | 7/2015 | Weiner | F01D 25/12 415/175 |
| 2015/0315923 | A1 * | 11/2015 | Bordoni | F02K 3/06 415/175 |
| 2016/0061056 | A1 * | 3/2016 | Appukuttan | F01D 25/10 415/144 |
| 2016/0131036 | A1 * | 5/2016 | Bintz | F01D 25/162 60/779 |
| 2016/0230595 | A1 * | 8/2016 | Wong | F01D 25/12 |
| 2017/0114721 | A1 * | 4/2017 | Miller | F02C 7/185 |
| 2017/0159489 | A1 * | 6/2017 | Sennoun | F02C 7/185 |

FOREIGN PATENT DOCUMENTS

| | | |
|---|---|---|
| GB | 2522307 A | 7/2015 |
| JP | 2002-181487 A | 6/2002 |
| JP | 2008-144752 A | 6/2008 |
| JP | 2011-521152 A | 7/2011 |
| WO | 02/38938 A1 | 5/2002 |
| WO | WO 0238938 A1 * | 5/2002 ............. F01D 9/065 |

OTHER PUBLICATIONS

Machine Translation and Notification of Reasons for Refusal issued in connection with corresponding JP Application No. 2016-241765 dated Jan. 24, 2018.

(56) References Cited

OTHER PUBLICATIONS

Machine Translation and First Office Action and Search issued in connection with corresponding CN Application No. 201611234111.4 dated Feb. 24, 2018.
Second Office Action and Search issued in connection with corresponding CN Application No. 201611234111.4 dated Dec. 5, 2018 (English Translation Not Available).

* cited by examiner

METHOD AND SYSTEM FOR COMBINATION HEAT EXCHANGER

BACKGROUND

The field of the disclosure relates generally to cooling systems in a gas turbine engines and, more particularly, to a method and system for cooling fluid in a gas turbine engine using a combination of different heat exchangers.

At least some known gas turbine engines include a fluid cooling system that is used to cool and lubricate components of the gas turbine engine. The fluid cooling system cools a fluid to remove heat transferred from the engine to the fluid. As gas turbine engines become larger and more powerful, more heat needs to be rejected from the gas turbine engine and the needed cooling capacity of the gas turbine engine increases. At least some known methods of increasing the cooling capacity of the gas turbine engine includes adding coolers and heat exchangers to the gas turbine engine. At least some of the known coolers and heat exchangers include compact heat exchangers known as brick coolers, surface coolers, and outlet guide vane heat exchangers which are all air-oil heat exchangers attached to the inner radial surface of the nacelle.

Each type of cooler or heat exchanger has a disadvantage. Brick coolers and surface coolers protrude into the bypass airflow passageway and create drag in the air flowing in the bypass airflow passageway. However, surface coolers protrude into the bypass airflow passageway to a much lesser extent than brick coolers and create substantially less drag. Outlet guide vane heat exchangers are heat exchangers incorporated into the already existing outlet guide vanes that support the nacelle. Outlet guide vane heat exchangers do not create any additional drag. However, the heat transfer area and heat transfer capability of outlet guide vane heat exchangers are limited and may not be sufficient to meet the oil cooling needs of a gas turbine engine. Increasing the cooling capacity of the gas turbine engine requires adding additional coolers while managing the disadvantages of each type of cooler or heat exchanger.

BRIEF DESCRIPTION

In one aspect, a heat exchanger system includes a first heat exchanger assembly including a plurality of airfoil members circumferentially spaced in a flow stream of an annular duct. Each airfoil member including a radially inner end and a radially outer end. Each airfoil member further including a first internal flowpath configured to channel a flow of cooled fluid therethrough. The heat exchanger assembly also includes a second heat exchanger assembly extending proximate the flow stream. The second heat exchanger assembly including a second internal flowpath configured to channel a flow of cooled fluid therethrough. The heat exchanger assembly further includes a header system including a conduit path configured to couple the first heat exchanger assembly and the second heat exchanger assembly in flow communication. The header system further including an inlet connection configured to receive a flow of relatively hot fluid from one or more thermal loads and an outlet connection configured to direct cooled fluid to the one or more thermal loads.

In another aspect, a method of heat exchange includes receiving a flow of relatively hot fluid at an inlet to a first heat exchanger. The first heat exchanger includes a plurality of guide vanes extending radially into an air stream from a radially outer wall to a radially inner wall. The method also includes channeling the relatively hot fluid through one or more fluid flow paths within the first heat exchanger. The relatively hot fluid releasing a portion of heat continued in the relatively hot fluid to the air stream. The method further includes receiving a flow of partially cooled fluid at an inlet to a second heat exchanger. The second heat exchanger includes a plurality of fins extending proximate the air stream from a radially outer wall. The method also includes channeling the flow of partially cooled fluid through one or more fluid flow paths within the second heat exchanger. The flow of partially cooled fluid releasing a portion of heat continued in the flow of partially cooled fluid to the air stream through the plurality of fins.

In yet another aspect, a gas turbine engine includes a core engine and a stationary annular casing at least partially surrounding the core engine forming an annular duct. The gas turbine engine also includes a heat exchanger assembly. The heat exchanger assembly includes a first heat exchanger assembly including a plurality of airfoil members circumferentially spaced in a flow stream of an annular duct. Each airfoil member including a radially inner end and a radially outer end. Each airfoil member further including a first internal flowpath configured to channel a flow of cooled fluid therethrough. The heat exchanger assembly also includes a second heat exchanger assembly extending proximate the flow stream. The second heat exchanger assembly including a second internal flowpath configured to channel a flow of cooled fluid therethrough. The heat exchanger assembly further includes a header system including a conduit path configured to couple the first heat exchanger assembly and the second heat exchanger assembly in flow communication. The header system further including an inlet connection configured to receive a flow of relatively hot fluid from one or more thermal loads and an outlet connection configured to direct cooled fluid to the one or more thermal loads.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1-12 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. It is contemplated that the disclosure has general application to a method and system for cooling oil in an aircraft engine.

Embodiments of the heat exchanger system described herein cool oil in a gas turbine engine. The heat exchanger system includes a plurality of outlet guide vane heat exchangers (OGVHE) that circumscribe at least a portion of a core engine and a plurality of surface coolers located on an inner radial surface of a nacelle. The surface coolers or brick cooler and the OGVHEs cool the oil by exchanging heat with fan exhaust air in the bypass airflow passageway. In an exemplary embodiment, the surface coolers or brick cooler and the OGVHEs are configured in a parallel flow configuration. The surface coolers or brick cooler and the OGVHEs receive relatively hot oil from the engine, cool the oil, and return the oil back to the engine. In another embodiment, the surface coolers or brick cooler and the OGVHEs are configured in a series flow configuration. The OGVHEs receive relatively hot oil from the engine, cool the oil, and channel the partially cooled oil to the surface coolers. The surface coolers or brick cooler cool the oil and return the oil to the engine. In another embodiment, the OGVHEs are configured in a hybrid series-parallel flow configuration in series or in parallel with a surface cooler or brick cooler. The OGVHEs are divided into multiple groups. A group of OGVHEs and a group of surfaces coolers or brick cooler are coupled in flow communication. Each group of OGVHEs receives relatively hot oil from the engine, cools the oil, and channels the oil to the respective group of surface coolers. The respective group of surface coolers cools the oil and returns the oil to the engine.

The heat exchanger systems described herein offer advantages over known methods of cooling oil in a gas turbine engine. More specifically, some known heat exchanger systems are heavier and generate more drag than the system described herein. Heat exchangers embedded in the already existing outlet guide vanes reduce weight and drag. Furthermore, some known heat exchanger systems have less heat exchange area and heat exchange capacity than the system described herein. Surface coolers combined with OGVHEs provide increased heat exchange area and heat exchange capacity.

Figure 1:
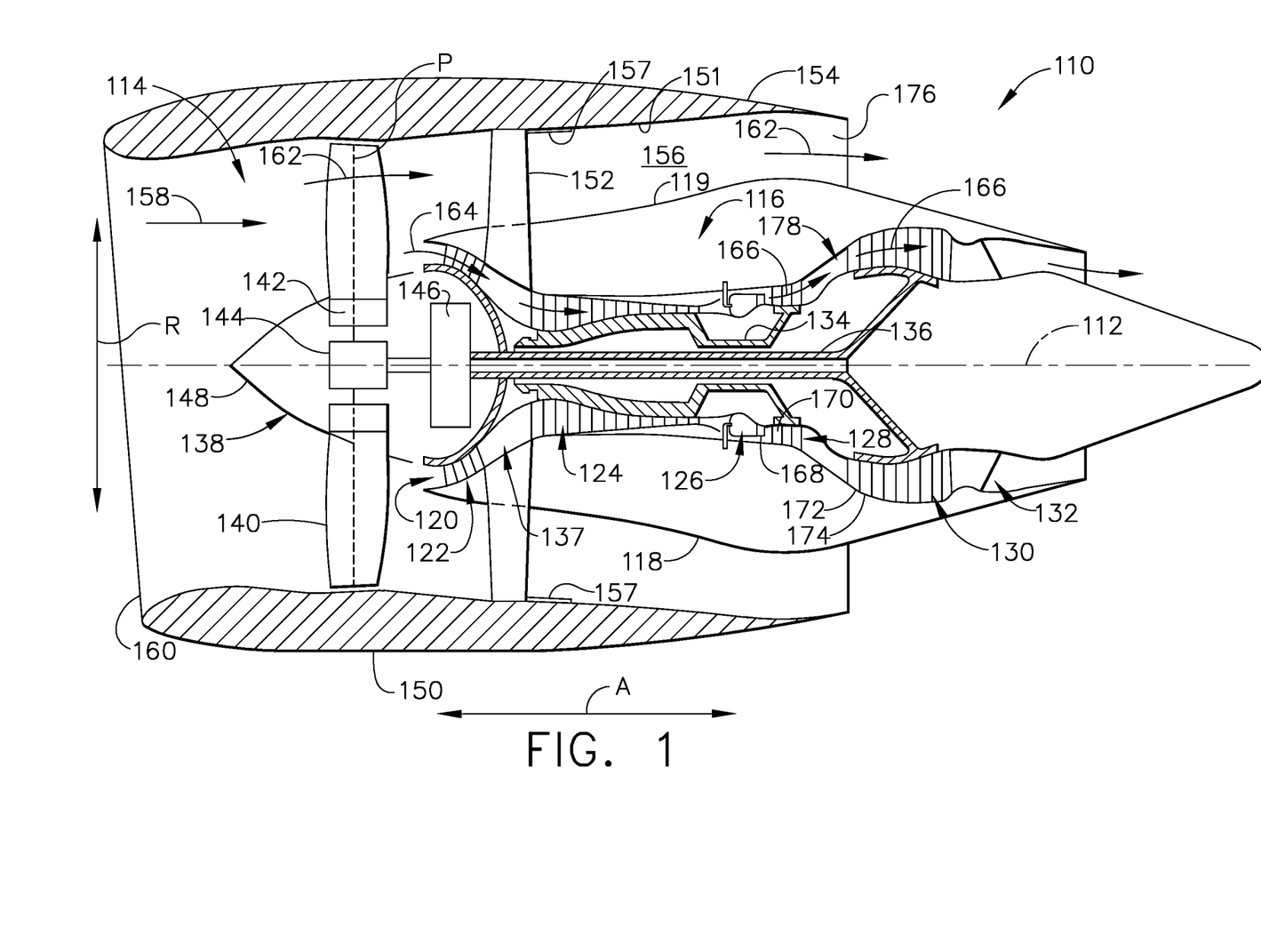
FIG. 1 is a schematic view of a gas turbine engine.

FIG. 1 is a schematic cross-sectional view of a gas turbine engine 110 in accordance with an exemplary embodiment of the present disclosure. In the example embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 includes an outer radial surface 119. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, turbine section, and nozzle section 132 together define a core air flowpath 137.

For the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed.

Referring still to the exemplary embodiment of FIG. 1, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 includes an inner radial surface 151. It should be appreciated that nacelle 150 may be configured to be supported relative to core turbine engine 116 by a plurality of circumferentially-spaced outlet guide vanes 152. In the exemplary embodiment, outlet guide vanes 152 include engine oil heat exchangers. Moreover, a downstream section 154 of nacelle 150 may extend over an outer portion of core turbine engine 116 so as to define a bypass airflow passage 156 therebetween. A plurality of surface coolers 157 is disposed on inner radial surface 151 of nacelle 150 in bypass airflow passage 156.

During operation of turbofan engine 110, a volume of air 158 enters turbofan 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 and HP turbine rotor blades 170. HP turbine stator vanes 168 are coupled to outer casing 118. HP turbine rotor blades 170 are coupled to HP shaft or spool 134. Rotation of HP turbine rotor blades 170 causes HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 and LP turbine rotor blades 174. LP turbine stator vanes 172 are coupled to outer casing 118. LP turbine rotor blades 174 are coupled to LP shaft or spool 136. Rotation of LP turbine rotor blades 174 causes LP shaft or spool 136 to rotate, thereby supporting operation of LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan 110, also providing propulsive thrust. HP turbine 128, LP turbine 130, and jet exhaust nozzle section 132 at least partially define a hot gas path 178 for routing combustion gases 166 through core turbine engine 116.

It should be appreciated, however, that exemplary turbofan engine 110 depicted in FIG. 1 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine.

Figure 2:
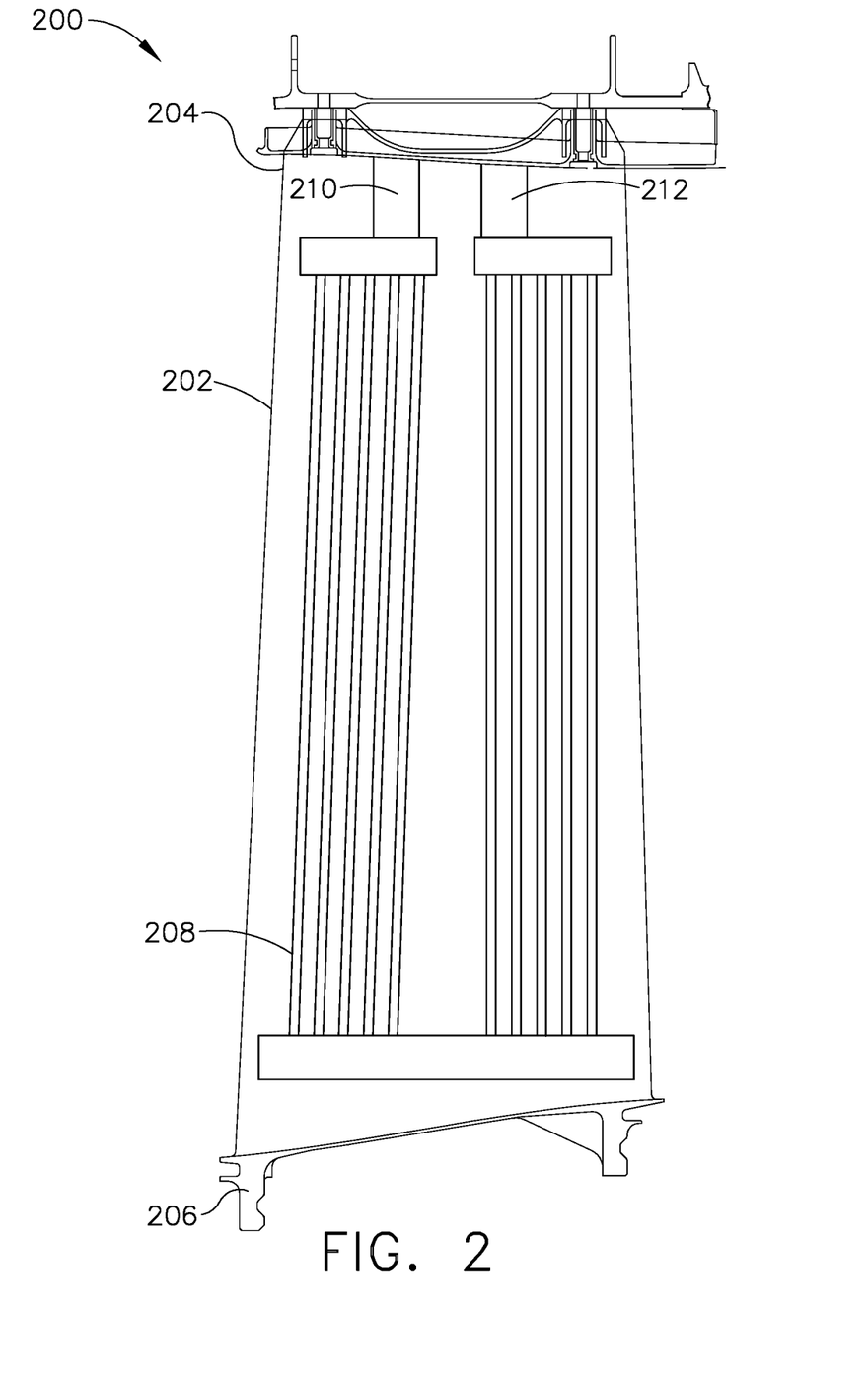
FIG. 2 is a schematic diagram of an outlet guide vane heat exchanger.

FIG. 2 is a schematic diagram of an airfoil member, specifically an outlet guide vane heat exchanger (OGVHE) 200. OGVHE 200 includes an airfoil body 202. OGVHE 200 also includes a radially inner end 204 and a radially outer end 206. Radially inner end 204 is coupled to core turbine engine 116 (shown in FIG. 1). Radially outer end 206 is coupled to and supports nacelle 150 (shown in FIG. 1) relative to core turbine engine 116 (shown in FIG. 1). A plurality of internal flow paths 208 is disposed within airfoil body 202. OGVHE 200 includes an outlet guide vane heat exchanger inlet 210 (OGVHE inlet 210) configured to receive oil and coupled in flow communication with internal flow paths 208. OGVHE 200 also includes an outlet guide vane heat exchanger outlet 212 (OGVHE outlet 212) coupled in flow communication with internal flow paths 208.

During operation, first portion of air 162 (shown in FIG. 1) in bypass airflow passage 156 (shown in FIG. 1) is configured to flow proximate to airfoil body 202 and configured to exchange heat with airfoil body 202. OGVHE inlet 210 is configured to receive a flow of fluid, such as, but not limited to, oil. OGVHE inlet 210 is configured to channel oil to internal flow paths 208. Oil in internal flow paths 208 is configured to exchange heat with first portion of air 162 (shown in FIG. 1) in bypass airflow passage 156 (shown in FIG. 1). Internal flow paths 208 are configured to channel oil to OGVHE outlet 212, which is coupled in flow communication to components of core turbine engine 116 (shown in FIG. 1).

Figures 3A, 3B:
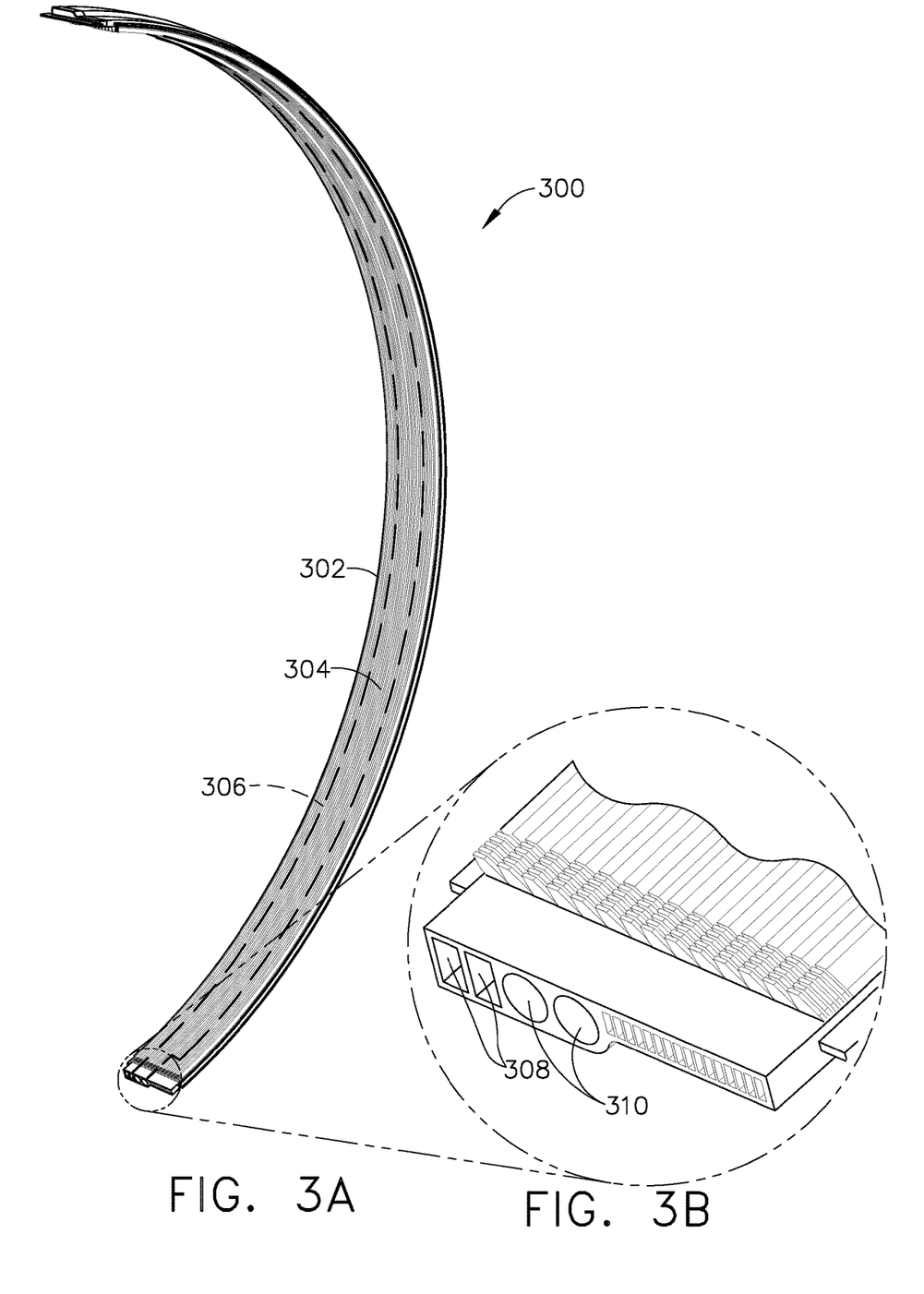
FIG. 3A is a schematic diagram of a surface cooler.
FIG. 3B is a schematic diagram of a surface cooler inlet and outlet.

FIG. 3A is a schematic diagram of a surface cooler 300. Surface cooler 300 includes a surface 302 disposed on inner radial surface 151 (shown in FIG. 1) of nacelle 150 (shown in FIG. 1). In an alternative embodiment, surface cooler 300 includes a surface 302 disposed on outer radial surface 119 (shown in FIG. 1) of outer casing 118 (shown in FIG. 1). Surface cooler 300 also includes a plurality of fin members 304 disposed on surface 302 and extending into bypass airflow passage 156 (shown in FIG. 1). FIG. 3A is a schematic diagram of a surface cooler 300 inlet and outlet. Surface cooler 300 includes a surface cooler inlet 308, a surface cooler outlet 310, and one or more internal flow paths 306 extending therebetween.

During operation, first portion of air 162 (shown in FIG. 1) in bypass airflow passage 156 (shown in FIG. 1) is configured to flow proximate to surface 302 to exchange heat with fin members 304. Surface cooler inlet 308 is configured to receive a flow of oil to be cooled and channel oil to internal flow paths 306. Oil in internal flow paths 306 is configured to exchange heat with first portion of air 162 (shown in FIG. 1) through fin members 304. Internal flow paths 306 are configured to channel oil to surface cooler outlet 310 which is configured to return oil to core turbine engine 116 (shown in FIG. 1).

Figure 4:
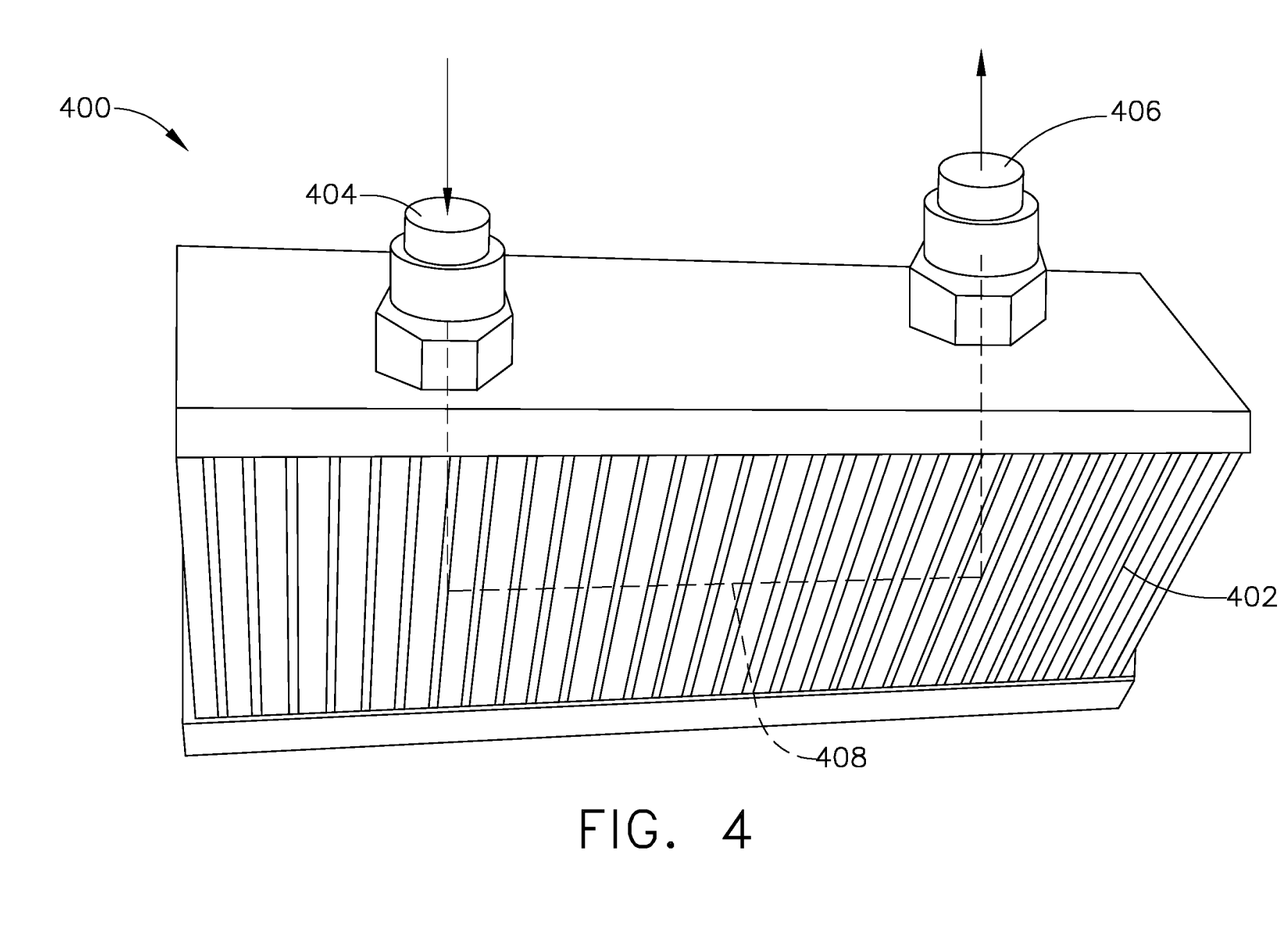
FIG. 4 is a schematic diagram of a brick cooler.

FIG. 4 is a schematic diagram of a brick cooler 400. Brick cooler 400 includes a body 402 disposed on inner radial surface 151 (shown in FIG. 1) of nacelle 150 (shown in FIG. 1). In an alternative embodiment, brick cooler 400 includes a body 402 disposed on outer radial surface 119 (shown in FIG. 1) of outer casing 118 (shown in FIG. 1). Body 402 extends into bypass airflow passage 156 (shown in FIG. 1). Brick cooler 400 includes a brick cooler inlet 404, a brick cooler outlet 406, and one or more internal flow paths 408 extending therebetween.

During operation, first portion of air 162 (shown in FIG. 1) in bypass airflow passage 156 (shown in FIG. 1) is configured to flow proximate to body 402 to exchange heat with body 402. Brick cooler inlet 404 is configured to receive a flow of oil to be cooled and channel oil to internal flow paths 408. Oil in internal flow paths 408 is configured to exchange heat with first portion of air 162 (shown in FIG. 1) through body 402. Internal flow paths 408 are configured to channel oil to brick cooler outlet 406 which is configured to return oil to core turbine engine 116 (shown in FIG. 1).

Figure 5:
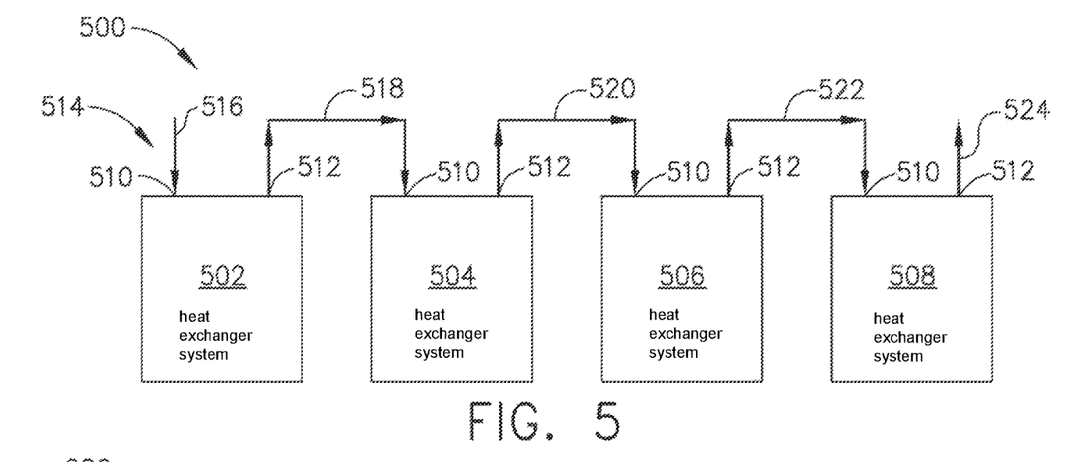
FIG. 5 is a diagram of heat exchanger system configured in a series flow configuration.

FIG. 5 is a diagram of heat exchanger system 500 configured in a series flow configuration. Heat exchanger system 500 includes a plurality of heat exchanger assemblies 502, 504, 506, and 508. In the exemplary embodiment, heat exchanger assemblies 502, 504, 506, and 508 include OGVHEs 200 (shown in FIG. 2), surface coolers 300 (shown in FIG. 3), and brick coolers 400 (shown in FIG. 4). Heat exchanger assemblies 502, 504, 506, and 508 each include a heat exchanger inlet 510 and a heat exchanger outlet 512. In the exemplary embodiment, heat exchanger inlet 510 includes OGVHE inlet 210 (shown in FIG. 2), surface cooler inlet 308 (shown in FIG. 3), or brick cooler inlet 404 (shown in FIG. 4) and heat exchanger outlet 512 includes OGVHE outlet 212 (shown in FIG. 2), surface cooler outlet 310 (shown in FIG. 3), or brick cooler outlet 406 (shown in FIG. 4). Heat exchanger system 500 includes a header system 514 comprising a plurality of conduits 516, 518, 520, 522, and 524.

Conduit 516 is coupled in flow communication with heat exchanger inlet 510 disposed on heat exchanger assembly 502. Heat exchanger outlet 512 disposed on heat exchanger assembly 502 is coupled in flow communication with conduit 518 which is coupled in flow communication with heat exchanger inlet 510 disposed on heat exchanger assembly 504. Heat exchanger outlet 512 disposed on heat exchanger assembly 504 is coupled in flow communication with conduit 520 which is coupled in flow communication with heat exchanger inlet 510 disposed on heat exchanger assembly 506. Heat exchanger outlet 512 disposed on heat exchanger assembly 506 is coupled in flow communication with conduit 522 which is coupled in flow communication with heat exchanger inlet 510 disposed on heat exchanger assembly 508. Heat exchanger outlet 512 disposed on heat exchanger assembly 508 is coupled in flow communication with conduit 524 which is coupled in flow communication with core turbine engine 116 (shown in FIG. 1).

During operation, conduit 516 is configured to receive a flow of cooled fluid and is configured to channel a flow of cooled fluid to heat exchanger inlet 510 disposed on heat exchanger assembly 502. In the exemplary embodiment, cooled fluid includes oil. Heat exchanger outlet 512 disposed on heat exchanger assembly 502 is configured to channel oil to conduit 518 which is configured to channel oil to heat exchanger inlet 510 disposed on heat exchanger assembly 504. Heat exchanger outlet 512 disposed on heat exchanger assembly 504 is configured to channel oil to conduit 520 which is configured to channel oil to heat exchanger inlet 510 disposed on heat exchanger assembly 506. Heat exchanger outlet 512 disposed on heat exchanger assembly 506 is configured to channel oil to conduit 522 which is configured to channel oil to heat exchanger inlet 510 disposed on heat exchanger assembly 508. Heat exchanger outlet 512 disposed on heat exchanger assembly 508 is configured to channel oil to conduit 524 which is configured to channel oil to core turbine engine 116 (shown in FIG. 1).

Figure 6:
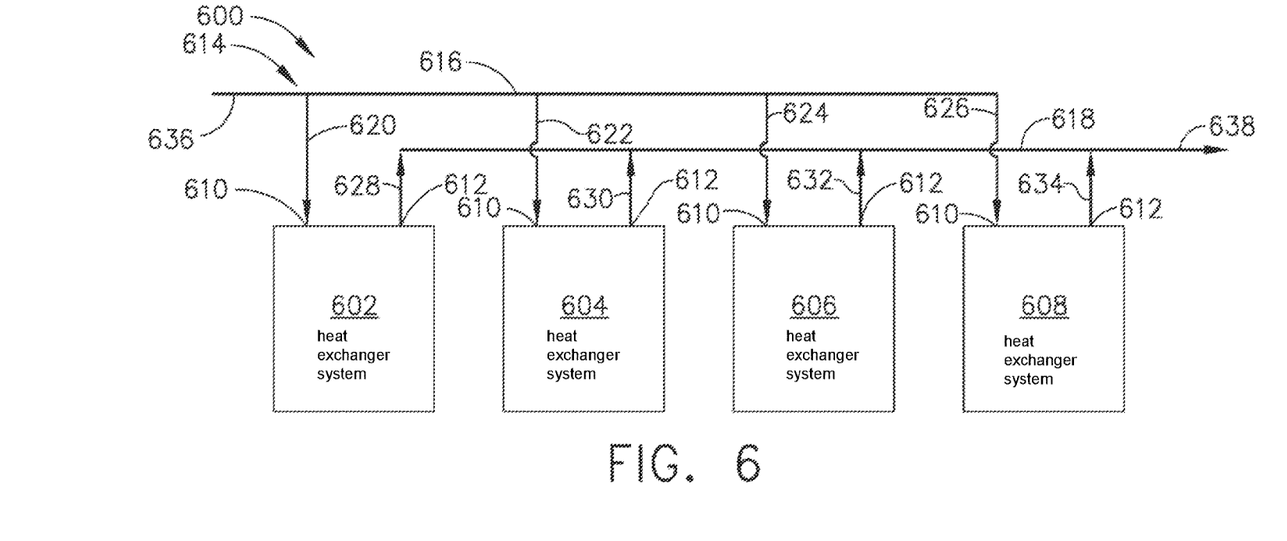
FIG. 6 is a diagram of heat exchanger system configured in a parallel flow configuration.

FIG. 6 is a diagram of heat exchanger system 600 configured in a parallel flow configuration. Heat exchanger system 600 includes a plurality of heat exchanger assemblies 602, 604, 606, and 608. In the exemplary embodiment, heat exchanger assemblies 602, 604, 606, and 608 include OGVHEs 200 (shown in FIG. 2), surface coolers 300 (shown in FIG. 3), and brick coolers 400 (shown in FIG. 4). Heat exchanger assemblies 602, 604, 606, and 608 each include a heat exchanger inlet 610 and a heat exchanger outlet 612. In the exemplary embodiment, heat exchanger inlet 610 includes OGVHE inlet 210 (shown in FIG. 2), surface cooler inlet 308 (shown in FIG. 3), or brick cooler inlet 404 (shown in FIG. 4) and heat exchanger outlet 612 includes OGVHE outlet 212 (shown in FIG. 2), surface cooler outlet 310 (shown in FIG. 3), or brick cooler outlet 406 (shown in FIG. 4). Heat exchanger system 600 includes a header system 614 comprising an inlet header 616, an outlet header 618, a plurality of inlet conduits 620, 622, 624, and 626, and a plurality of outlet conduits 628, 630, 632, and 634. Inlet header 616 includes a cooled fluid inlet 636 and outlet header 618 includes a cooled fluid outlet 638.

Inlet header 616 is coupled in flow communication with inlet conduits 620, 622, 624, and 626. Inlet conduits 620, 622, 624, and 626 are coupled in flow communication with heat exchanger inlets 610 disposed on heat exchanger assemblies 602, 604, 606, and 608 respectively. Heat exchanger outlets 612 disposed on heat exchanger assemblies 602, 604, 606, and 608 are coupled in flow communication with outlet conduits 628, 630, 632, and 634 respectively. Outlet conduits 628, 630, 632, and 634 are coupled in flow communication with outlet header 618.

During operation, cooled fluid inlet 636 is configured to receive a flow of cooled fluid and is configured to channel a flow of cooled fluid to inlet header 616. In the exemplary embodiment, cooled fluid includes oil. Inlet header 616 is configured to channel oil to inlet conduits 620, 622, 624, and 626 which are configured to channel oil to heat exchanger inlets 610 disposed on heat exchanger assemblies 602, 604, 606, and 608 respectively. Heat exchanger outlets 612 disposed on heat exchanger assemblies 602, 604, 606, and 608 are configured to channel oil to outlet conduits 628, 630, 632, and 634 respectively. Outlet conduits 628, 630, 632, and 634 are configured to channel oil to outlet header 618 which is configured to channel oil to cooled fluid outlet 638. Cooled fluid outlet 638 is configured to channel oil to core turbine engine 116 (shown in FIG. 1).

Figure 7:
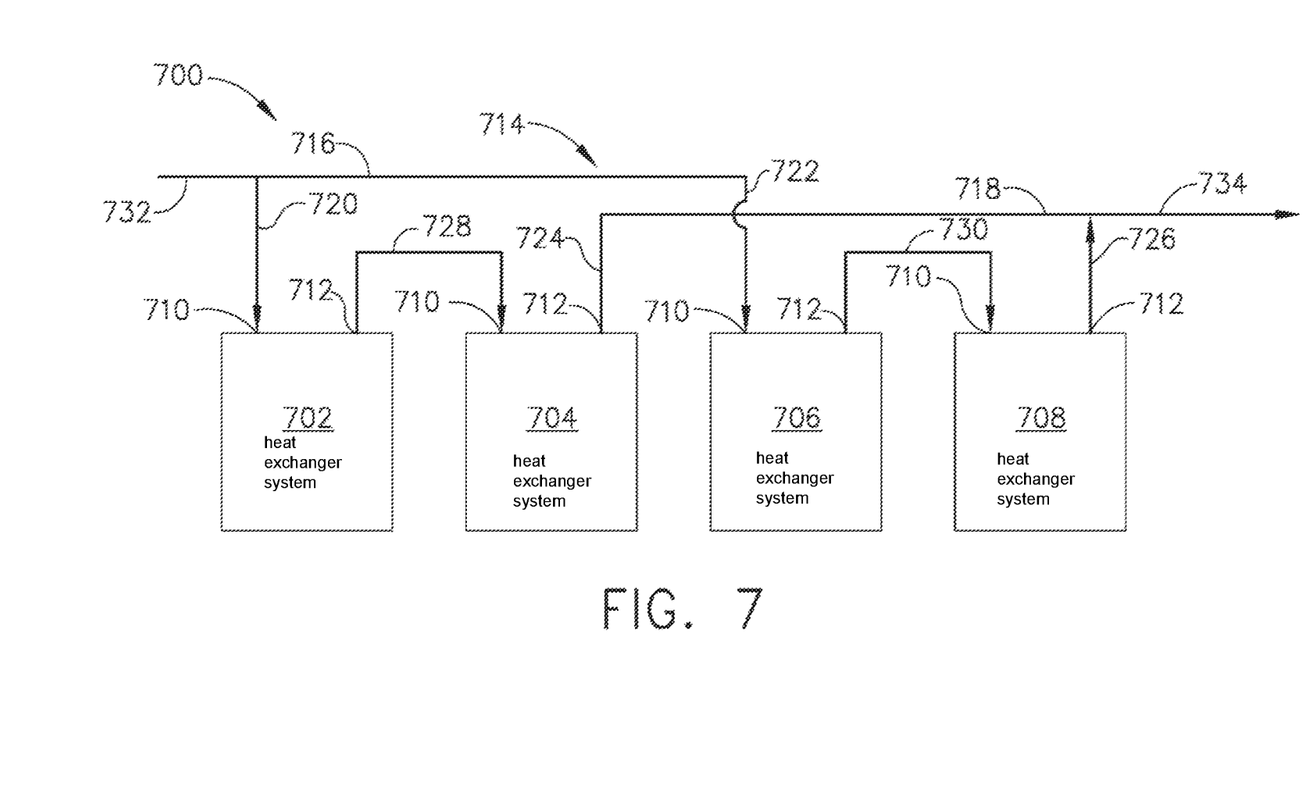
FIG. 7 is a diagram of heat exchanger system configured in a hybrid series-parallel flow configuration.

FIG. 7 is a diagram of heat exchanger system 700 configured in a hybrid series-parallel flow configuration. Heat exchanger system 700 includes a plurality of heat exchanger assemblies 702, 704, 706, and 708. In the exemplary embodiment, heat exchanger assemblies 702, 704, 706, and 708 include OGVHEs 200 (shown in FIG. 2), surface coolers 300 (shown in FIG. 3), and brick coolers 400 (shown in FIG. 4). Heat exchanger assemblies 702, 704, 706, and 708 each include a heat exchanger inlet 710 and a heat exchanger outlet 712. In the exemplary embodiment, heat exchanger inlet 710 includes OGVHE inlet 210 (shown in FIG. 2), surface cooler inlet 308 (shown in FIG. 3), or brick cooler inlet 404 (shown in FIG. 4) and heat exchanger outlet 712 includes OGVHE outlet 212 (shown in FIG. 2), surface cooler outlet 310 (shown in FIG. 3), or brick cooler outlet 406 (shown in FIG. 4). Heat exchanger system 700 includes a header system 714 comprising an inlet header 716, an outlet header 718, a plurality of inlet conduits 720 and 722, a plurality of outlet conduits 724 and 726, and a plurality of transfer conduits 728 and 730. Inlet header 716 includes a cooled fluid inlet 732 and outlet header 718 includes a cooled fluid outlet 734.

Inlet header 716 is coupled in flow communication with inlet conduits 720 and 722. Inlet conduits 720 and 722 are coupled in flow communication with heat exchanger inlets 710 disposed on heat exchanger assemblies 702 and 706 respectively. Heat exchanger outlets 712 disposed on heat exchanger assemblies 702 and 706 are coupled in flow communication with transfer conduits 728 and 730 respectively. Transfer conduits 728 and 730 are coupled in flow communication with heat exchanger inlets 710 disposed on heat exchanger assemblies 704 and 708 respectively. Heat exchanger outlets 712 disposed on heat exchanger assemblies 704 and 708 are coupled in flow communication with outlet conduits 724 and 726 respectively. Outlet conduits 724 and 726 are coupled in flow communication with outlet header 718 which is couple in flow communication with cooled fluid outlet 734.

During operation, cooled fluid inlet 732 is configured to receive a flow of cooled fluid and is configured to channel a flow of cooled fluid to inlet header 716. In the exemplary embodiment, cooled fluid includes oil. Inlet header 716 is configured to channel oil to inlet conduits 720 and 722 which are configured to channel oil to heat exchanger inlets 710 disposed on heat exchanger assemblies 702 and 706 respectively. Heat exchanger outlets 712 disposed on heat exchanger assemblies 702 and 706 are configured to channel oil to transfer conduits 728 and 730 respectively. Transfer conduits 728 and 730 are configured to channel oil to heat exchanger inlets 710 disposed on heat exchanger assemblies 704 and 708 respectively. Heat exchanger outlets 712 disposed on heat exchanger assemblies 704 and 708 are configured to channel oil to outlet conduits 724 and 726 respectively. Outlet conduits 724 and 726 are configured to channel oil to outlet header 718 which is configured to channel oil to cool fluid outlet 734. Cooled fluid outlet 734 is configured to channel oil to core turbine engine 116 (shown in FIG. 1).

Figure 8:
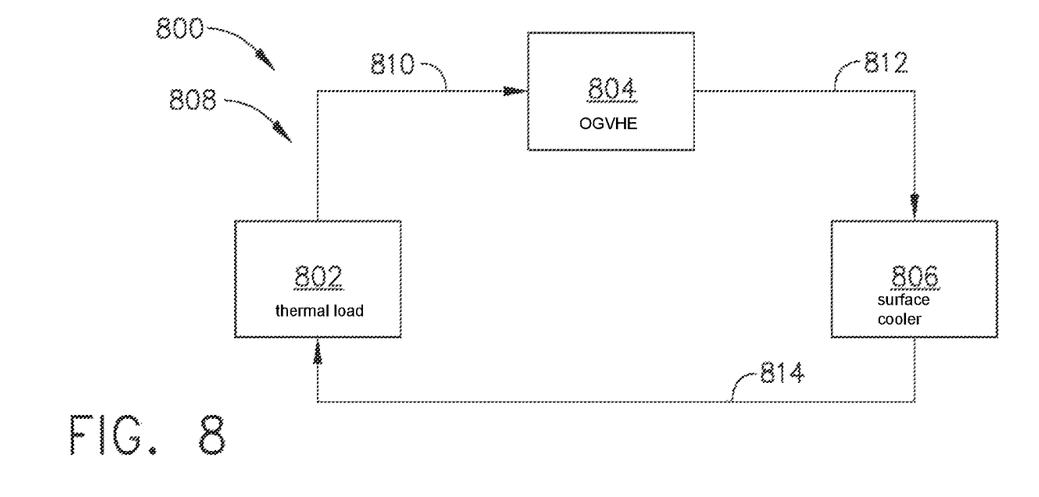
FIG. 8 is a diagram of heat exchanger system in an aircraft engine configured in a series flow configuration.

FIG. 8 is a diagram of heat exchanger system 800 in core turbine engine 116 (shown in FIG. 1) configured in a series flow configuration. Heat exchanger system 800 includes a thermal load 802, a plurality of outlet guide vane heat exchangers (OGVHEs) 804, a plurality of surface coolers 806, and a header system 808. In the exemplary embodiment, thermal load 802 includes core turbine engine 116 (shown in FIG. 1). OGVHEs 804 may be configured in the series flow configuration shown in FIG. 5, the parallel flow configuration shown in FIG. 6, or the hybrid series-parallel flow configuration shown in FIG. 7. Surface coolers 806 may be configured in the series flow configuration shown in FIG. 5, the parallel flow configuration shown in FIG. 6, or the hybrid series-parallel flow configuration shown in FIG. 7.

Header system 808 includes a plurality of inlet headers 810, a plurality of transfer headers 812, and a plurality of outlet headers 814. Inlet headers 810 are coupled in flow communication with thermal load 802 and OGVHEs 804. OGVHEs 804 are coupled in flow communication with transfer headers 812 which are coupled in flow communication with surface coolers 806. Surface coolers 806 are coupled in flow communication with outlet headers 812 which are coupled in flow communication with thermal load 802.

During operation, inlet headers 810 are configured to receive a flow of cooled fluid and are configured to channel a flow of cooled fluid to OGVHEs 804. In the exemplary embodiment, cooled fluid includes oil. OGVHEs 804 are configured to channel a flow of oil to transfer headers 812 which are configured to channel a flow of oil to surface coolers 806. Surface coolers 806 are configured to channel a flow of oil to outlet headers 812 which are configured to channel a flow of oil to thermal load 802.

Figure 9:
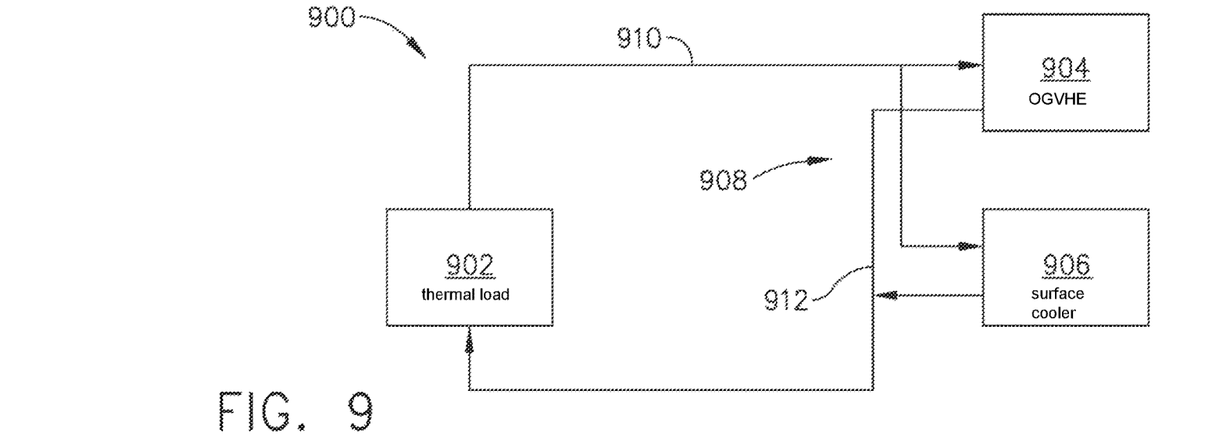
FIG. 9 is a diagram of heat exchanger system in an aircraft engine configured in a parallel flow configuration.

FIG. 9 is a diagram of heat exchanger system 900 in core turbine engine 116 (shown in FIG. 1) configured in a parallel flow configuration. Heat exchanger system 900 includes a thermal load 902, a plurality of outlet guide vane heat exchangers (OGVHEs) 904, a plurality of surface coolers 906, and a header system 908. In the exemplary embodiment, thermal load 902 includes components of core turbine engine 116 (shown in FIG. 1). OGVHEs 904 may be configured in the series flow configuration shown in FIG. 5, the parallel flow configuration shown in FIG. 6, or the hybrid series-parallel flow configuration shown in FIG. 7. Surface coolers 906 may be configured in the series flow configuration shown in FIG. 5, the parallel flow configuration shown in FIG. 6, or the hybrid series-parallel flow configuration shown in FIG. 7.

Header system 908 includes a plurality of inlet headers 910 and a plurality of outlet headers 912. Thermal load 902 is coupled in flow communication with inlet headers 910 which are coupled in flow communication with OGVHEs 904 and surface coolers 906. OGVHEs 904 and surface coolers 906 are coupled in flow communication with outlet headers 912 which are coupled in flow communication with thermal load 902.

During operation, inlet headers 910 are configured to receive a flow of cooled fluid and are configured to channel a flow of cooled fluid to OGVHEs 904 and surface coolers 906. In the exemplary embodiment, cooled fluid includes oil. OGVHEs 904 and surface coolers 906 are configured to channel a flow of oil to outlet headers 912 which are configured to channel a flow of oil to thermal load 902.

Figure 10:
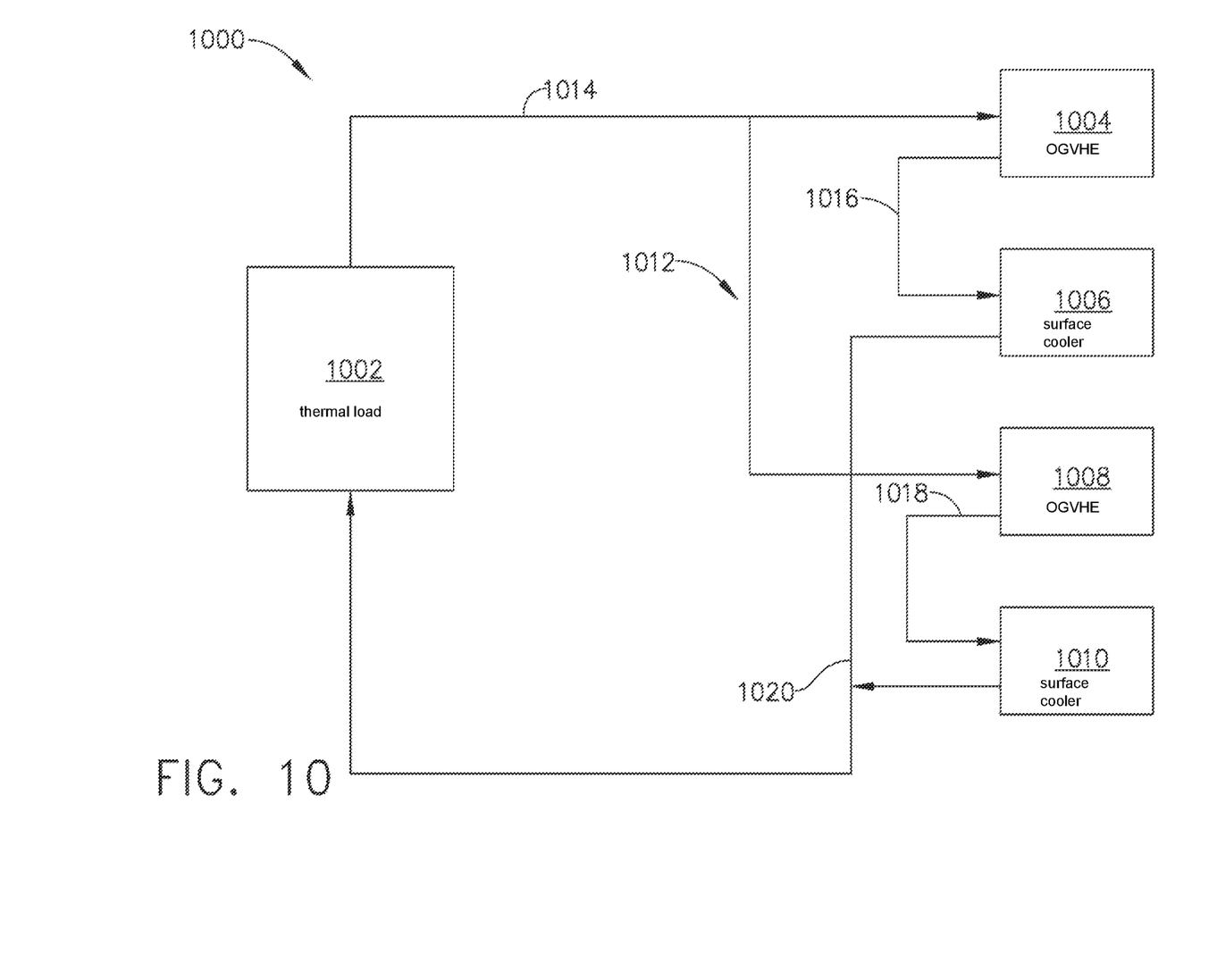
FIG. 10 is a diagram of heat exchanger system in an aircraft engine configured in a hybrid series-parallel flow configuration.

FIG. 10 is a diagram of heat exchanger system 1000 in core turbine engine 116 (shown in FIG. 1) configured in a hybrid series-parallel flow configuration. Heat exchanger system 1000 includes a thermal load 1002, a plurality of outlet guide vane heat exchangers (OGVHEs) 1004 and 1008, a plurality of surface coolers 1006 and 1010, and a header system 1012. In the exemplary embodiment, thermal load 1002 includes core turbine engine 116 (shown in FIG. 1). OGVHEs 1004 and 1008 may be configured in the series flow configuration shown in FIG. 5, the parallel flow configuration shown in FIG. 6, or the hybrid series-parallel flow configuration shown in FIG. 7. Surface coolers 1006 and 1010 may be configured in the series flow configuration shown in FIG. 5, the parallel flow configuration shown in FIG. 6, or the hybrid series-parallel flow configuration shown in FIG. 7.

Header system 1012 includes a plurality of inlet headers 1014, a plurality of transfer headers 1016 and 1018, and a plurality of outlet headers 1020. Thermal load 1002 is coupled in flow communication with inlet headers 1014 which are coupled in flow communication with OGVHEs 1004 and 1008. OGVHEs 1004 and 1008 are coupled in flow communication with transfer headers 1016 and 1018 respectively. Transfer headers 1016 and 1018 are coupled in flow communication with surface coolers 1006 and 1010 respectively. Surface coolers 1006 and 1010 are coupled in flow communication with outlet headers 1020 which are coupled in flow communication with thermal load 1002.

During operation, thermal load 1002 is configured to channel a flow of cooled fluid to inlet headers 1014 which are configured to channel a flow of cooled fluid to OGVHEs 1004 and 1008. In the exemplary embodiment, cooled fluid includes oil. OGVHEs 1004 and 1008 are configured to channel a flow of oil to transfer headers 1016 and 1018 respectively. Transfer headers 1016 and 1018 are configured to channel a flow of oil to surface coolers 1006 and 1010 respectively. Surface coolers 1006 and 1010 are configured to channel a flow of oil to outlet headers 1020 which are configured to channel a flow of oil to thermal load 1002.

Figure 11:
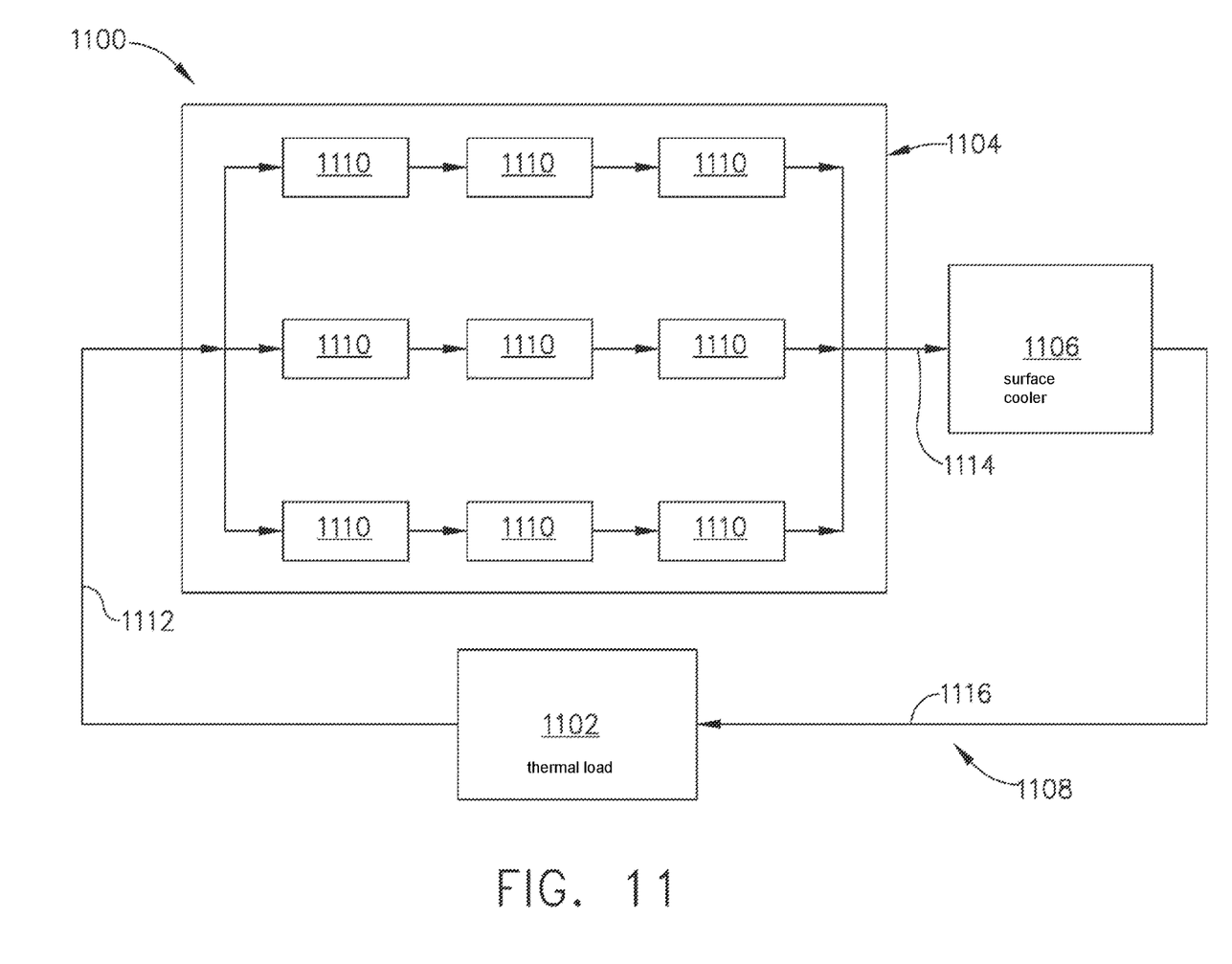
FIG. 11 is a diagram of an OGVHE-surface cooler or brick cooler heat exchanger system in an aircraft engine configured in a series flow configuration.

FIG. 11 is a diagram of an OGVHE-surface cooler heat exchanger system 1100 in core turbine engine 116 (shown in FIG. 1) configured in a series flow configuration. Heat exchanger system 1100 includes a thermal load 1102, an outlet guide vane heat exchanger (OGVHE) network 1104, a surface cooler 1106, and a header system 1108. In the exemplary embodiment, thermal load 1102 includes core turbine engine 116 (shown in FIG. 1). OGVHE network 1104 includes a plurality of outlet guide vane heat exchanger (OGVHEs) 1110. OGVHEs 1110 within OGVHE network 1104 are configured in the hybrid series-parallel flow configuration shown in FIG. 7.

Header system 1108 includes a plurality of inlet headers 1112, a plurality of transfer headers 1114, and a plurality of outlet headers 1116. Inlet headers 1112 are coupled in flow communication with thermal load 1102 and OGVHE network 1104. OGVHE network 1104 is coupled in flow communication with transfer headers 1114 which are coupled in flow communication with surface cooler 1106. Surface cooler 1106 is coupled in flow communication with outlet headers 1116 which are coupled in flow communication with thermal load 1102.

During operation, inlet headers 1112 are configured to receive a flow of cooled fluid and are configured to channel a flow of cooled fluid to OGVHE network 1104. In the exemplary embodiment, cooled fluid includes oil. OGVHE network 1104 are configured to channel a flow of oil to transfer headers 1114 which are configured to channel a flow of oil to surface cooler 1106. Surface cooler 1106 is configured to channel a flow of oil to outlet headers 1116 which are configured to channel a flow of oil to thermal load 1102.

Figure 12:
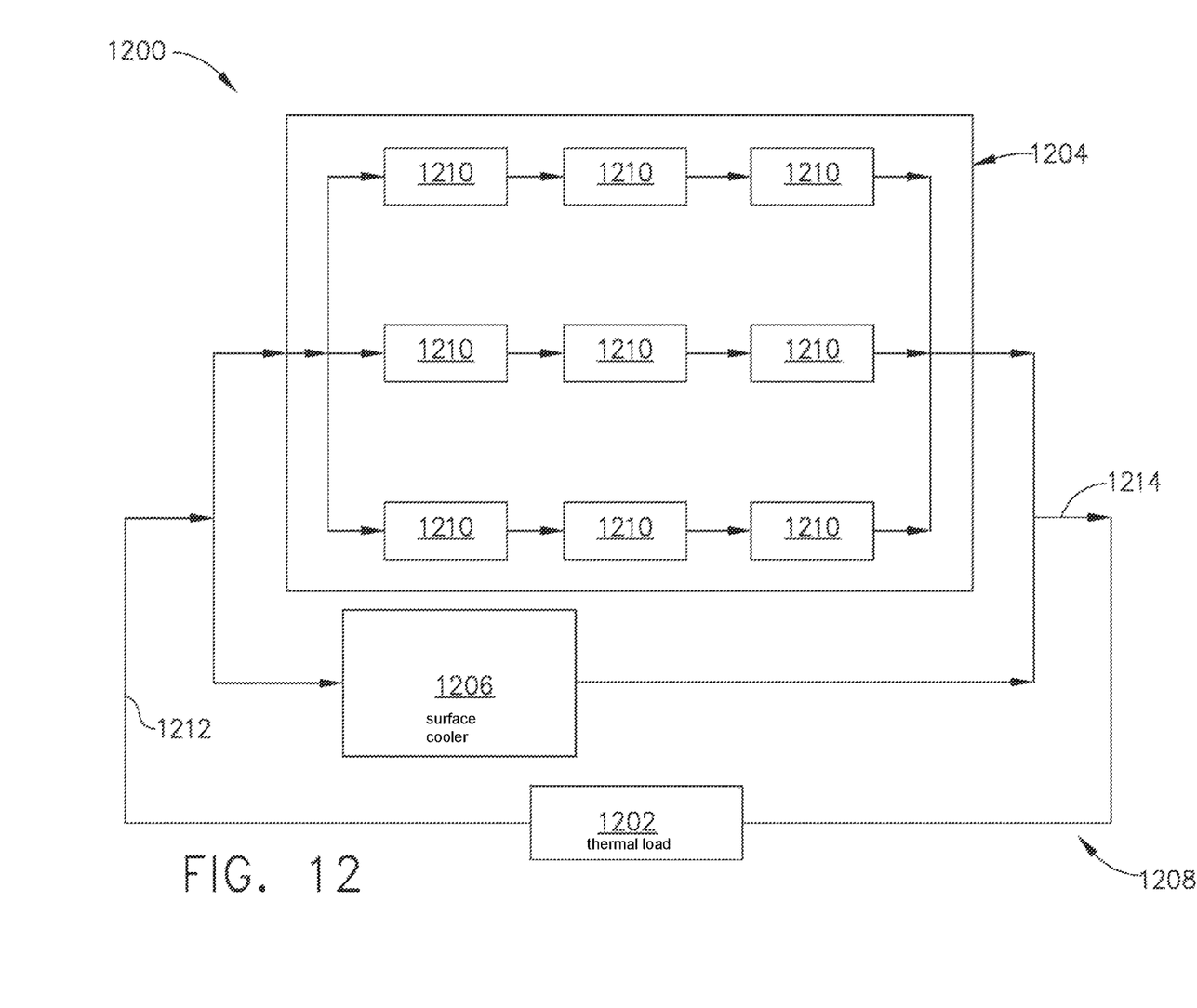
FIG. 12 is a diagram of an OGVHE-surface cooler or brick cooler heat exchanger system in an aircraft engine configured in a parallel flow configuration.

FIG. 12 is a diagram of an OGVHE-surface cooler heat exchanger system 1200 in core turbine engine 116 (shown in FIG. 1) configured in a parallel flow configuration. Heat exchanger system 1200 includes a thermal load 1202, an outlet guide vane heat exchangers (OGVHE) network 1204, a surface cooler 1206, and a header system 1208. In the exemplary embodiment, thermal load 1202 includes components of core turbine engine 116 (shown in FIG. 1). OGVHE network 1204 includes a plurality of outlet guide vane heat exchanger (OGVHEs) 1210. OGVHEs 1210 within OGVHE network 1204 are configured in the hybrid series-parallel flow configuration shown in FIG. 7.

Header system 1208 includes a plurality of inlet headers 1212 and a plurality of outlet headers 1214. Thermal load 1202 is coupled in flow communication with inlet headers 1212 which are coupled in flow communication with OGVHE network 1204 and surface cooler 1206. OGVHE network 1204 and surface cooler 1206 are coupled in flow communication with outlet headers 1214 which are coupled in flow communication with thermal load 1202.

During operation, inlet headers 1212 are configured to receive a flow of cooled fluid and are configured to channel a flow of cooled fluid to OGVHE network 1204 and surface cooler 1206. In the exemplary embodiment, cooled fluid includes oil. OGVHE network 1204 and surface cooler 1206 are configured to channel a flow of oil to outlet headers 1214 which are configured to channel a flow of oil to thermal load 1202.

The above-described heat exchange systems provide an efficient method for cooling oil in a gas turbine engine. Specifically, the above-described heat exchange system provides increased heat exchange area and heat exchange capacity. When surface coolers and OGVHEs are configured in series, parallel, and hybrid series-parallel flow configuration, increased heat exchange area and heat exchange capacity is provided. As such, cooling oil with surface coolers and OGVHEs increases heat exchange area and heat exchange capacity. Additionally, OGVHEs generate less drag and reduce the weight of the engine.

Exemplary embodiments of heat exchange systems are described above in detail. The heat exchange systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring oil cooling, and are not limited to practice with only the systems and methods as described herein. Rather, the exemplary embodiment can be implemented and utilized in connection with many other machinery applications that are currently configured to receive and accept heat exchange systems.

Example methods and apparatus for cooling oil in a gas turbine engine are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat exchanger system comprising:
    a first heat exchanger assembly comprising a first inlet and a plurality of airfoil members circumferentially spaced in a flow stream of an annular bypass airflow passageway of a gas turbine engine, each airfoil member comprising an inner end and an outer end along a radial direction, each airfoil member further comprising a first internal flowpath configured to channel a first fluid from a thermal load therethrough;
    a second heat exchanger assembly extending proximate said flow stream, said second heat exchanger assembly comprising a second inlet, and a second internal flowpath configured to channel a second fluid from the thermal load therethrough, wherein said second heat exchanger assembly comprises a surface cooler having a plurality of fin members extending into the bypass airflow passageway of the gas turbine engine; and
    a header system comprising a conduit configured to couple said first heat exchanger assembly and said second heat exchanger assembly in parallel flow communication, said header system further comprising an inlet connection configured to receive a flow of relatively hot fluid from the thermal load and an outlet connection configured to direct a flow of cooled fluid to the thermal load, wherein said inlet connection is coupled to each of said first inlet and said second inlet, wherein the first heat exchanger assembly and the second heat exchanger assembly are configured to exchange heat with air in the bypass airflow passageway of the gas turbine engine, and wherein the air in the bypass airflow passageway flows to and exchanges heat with the plurality of fin members of the surface cooler, and wherein the plurality of fin members are disposed on an inner surface of a nacelle that surrounds the bypass airflow passageway.

2. The heat exchanger system of claim 1, wherein said inlet connection is configured to channel said flow of relatively hot fluid to said first heat exchanger assembly.

3. The heat exchanger system of claim 1, wherein said inlet connection is configured to channel said flow of relatively hot fluid to said first heat exchanger assembly and said second heat exchanger assembly substantially simultaneously.

4. The heat exchanger system of claim 1, wherein said outlet connection is configured to receive said second fluid from said second heat exchanger assembly.

5. The heat exchanger system of claim 1, wherein said outlet connection is configured to receive said first fluid from said first heat exchanger assembly and said second fluid from said second heat exchanger assembly substantially simultaneously.

6. The heat exchanger system of claim 1, wherein said first heat exchanger assembly further comprises a first outlet, wherein said second heat exchanger assembly further comprises a second outlet, and wherein said outlet connection is coupled to each of said first outlet and said second outlet in parallel.

7. The heat exchanger system of claim 1, wherein said first fluid is cooled with the first heat exchanger assembly and returned to the thermal load via the outlet connection and said second fluid is cooled with the second heat exchanger assembly and simultaneously returned to the thermal load via the outlet connection.

8. The heat exchanger system of claim 1, wherein the surface cooler includes a first surface cooler inlet, a second surface cooler inlet, a first surface cooler outlet, and a second surface cooler outlet each on a same side of the surface cooler.

9. A gas turbine engine comprising:
a core engine;
a stationary annular casing at least partially surrounding said core engine forming an annular bypass airflow passageway;
a heat exchanger system comprising:
a first heat exchanger assembly comprising a first inlet and a plurality of airfoil members circumferentially spaced in a flow stream of said annular bypass airflow passageway, each airfoil member comprising an inner end and an outer end along a radial direction, each airfoil member further comprising a first internal flowpath configured to channel a first fluid from a thermal load therethrough;
a second heat exchanger assembly extending proximate said flow stream, said second heat exchanger assembly comprising a second inlet, and a second internal flowpath configured to channel a second fluid from the thermal load therethrough, wherein said second heat exchanger assembly comprises a surface cooler having a plurality of fin members extending into the bypass airflow passageway of the gas turbine engine; and
a header system comprising a conduit configured to couple said first heat exchanger assembly and said second heat exchanger assembly in parallel flow communication, said header system further comprising an inlet connection configured to receive a flow of relatively hot fluid from said core engine and an outlet connection configured to direct a flow of cooled fluid to said core engine, wherein said inlet connection is coupled to each of said first inlet and said second inlet,
wherein the first heat exchanger assembly and the second heat exchanger assembly are configured to exchange heat with air in the bypass airflow passageway of the gas turbine engine, and wherein the air in the bypass airflow passageway flows to and exchanges heat with the plurality of fin members of the surface cooler, and wherein the plurality of fin members are disposed on an inner surface of a nacelle that surrounds the bypass airflow passageway.

10. The gas turbine engine of claim 9, wherein said inlet connection is configured to channel said flow of relatively hot fluid to said first heat exchanger assembly.

11. The gas turbine engine of claim 10, wherein said outlet connection is configured to receive said second fluid from said second heat exchanger assembly.

12. The gas turbine engine of claim 11, wherein said airfoil members within said first heat exchanger assembly are configured in a hybrid series-parallel flow configuration.

13. The gas turbine engine of claim 9, wherein said inlet connection is configured to channel said flow of relatively hot fluid to said first heat exchanger assembly and said second heat exchanger assembly substantially simultaneously.

14. The gas turbine engine of claim 13, wherein said outlet connection is configured to receive said first fluid from said first heat exchanger assembly and said second fluid from said second heat exchanger assembly substantially simultaneously.

15. The gas turbine engine of claim 14, wherein said airfoil members within said first heat exchanger assembly are configured in a hybrid series-parallel flow configuration.

16. The gas turbine engine of claim 9, wherein said first heat exchanger assembly further comprises a first outlet, wherein said second heat exchanger assembly further comprises a second outlet, and wherein said outlet connection is coupled to each of said first outlet and said second outlet in parallel.

17. The heat exchanger system of claim 9, wherein said first fluid is cooled with the first heat exchanger assembly and returned to the thermal load via the outlet connection and said second fluid is cooled with the second heat exchanger assembly and simultaneously returned to the thermal load via the outlet connection.

* * * * *